2,741,611

N-SUBSTITUTED DIHYDRODESOXYNOR-
MORPHINE COMPOUNDS

Robert L. Clark, Woodbridge, N. J., assignor to Merck
& Co., Inc., Rahway, N. J., a corporation of New
Jersey No Drawing. Application November 22, 1952,
Serial No. 322,142

12 Claims. (Cl. 260—285)

This invention is concerned generally with novel derivatives of morphine and with processes for preparing these morphine derivatives. More particularly, it relates to novel N-substituted dihydrodesoxynormorphine compounds having attached to the nitrogen atom the terminal carbon of a straight aliphatic chain consisting of three carbon atoms, to lower alkanoyl esters of these N-substituted dihydrodesoxynormorphine compounds, to acid salts thereof, and to novel processes for preparing these compounds starting with the corresponding N-substituted dihydrodesoxynorcodeine compound or with the corresponding N-substituted desoxynormorphine compound. These N-substituted dihydrodesoxynormorphine compounds, their esters, and salts thereof, are active as morphine antagonists.

The N-substituted dihydrodesoxynormophine compounds, their esters, and acid salts thereof, subject of the present invention, may be chemically represented by the following structural formulae:

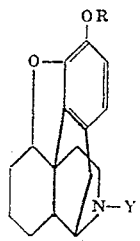 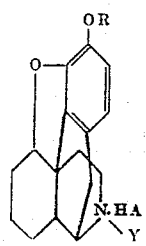

wherein R is hydrogen or a lower alkanoyl radical, Y is an aliphatic radical containing a straight chain consisting of three carbon atoms a terminal carbon of which is attached to the nitrogen atom, and HA is an acid.

The chemical relationship of these N-substituted dihydrodesoxynormorphine compounds, and their esters, to morphine is clear from a comparison of the foregoing formulae with the formula for morphine which is as follows:

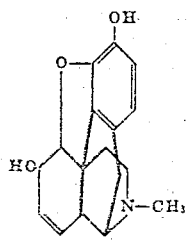

Whereas the alkaloid morphine is a potent analgesic, I have found that N-substituted dihydrodesoxynormorphine compounds having attached to the nitrogen atom the terminal carbon of a straight aliphatic chain consisting of three carbon atoms, in particular N-n-propyldihydrodesoxynormorphine, N-isobutyldihydrodesoxynormorphine, N-allyldihydrodesoxynormorphine, N-methallyldihydrodesoxynormorphine, the lower alkanoyl esters of these N-substituted dihydrodesoxynormorphine compounds, and acid salts thereof, do not possess any significant analgesic action but, instead, are strong morphine antagonists and prevent or abolish the analgesic action of morphine when utilized in conjunction with that drug. This antagonistic action possessed by the subject compounds is particularly surprising considering the fact that one N-alkyldihydrodesoxynormorphine compound, namely N-methyldihydrodesoxynormorphine (i. e. dihydrodesoxymorphine) is ten times as potent an analgesic as morphine, and in view of the further fact that N-methyldihydrodesoxynormorphine as well as other N-alkyldihydrodesoxynormorphine compounds such as N-n-butyldihydrodesoxynormorphine, N-amyldihydrodesoxynormorphine and N-hexyldihydrodesoxynormorphine exhibit no appreciable morphine antagonistic activity.

The N-substituted dihydrodesoxynormorphine compounds having attached to the nitrogen atom the terminal carbon of a straight aliphatic chain consisting of three carbon atoms, the lower alkanoyl esters of these N-substituted dihydrodesoxynormorphine compounds, and acid salts thereof, can be prepared by reactions which may be chemically represented as follows:

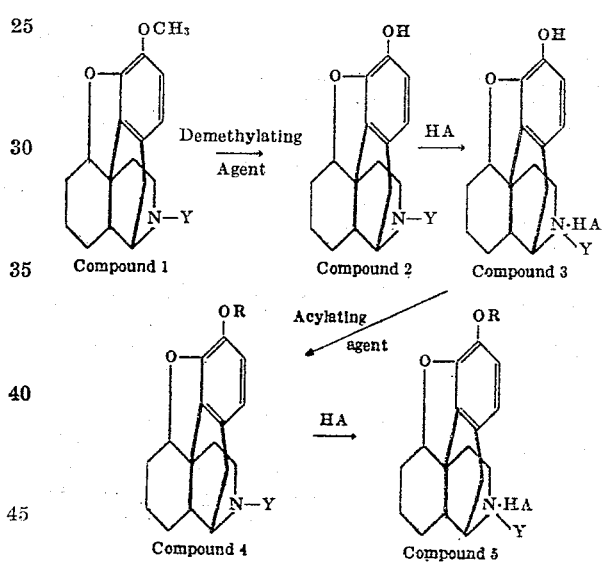

wherein R is a lower alkanoyl radical, Y is an aliphatic radical containing a straight chain consisting of three carbon atoms a terminal carbon of which is attached to the nitrogen atom, and HA is an acid.

The reactions indicated hereinabove are carried out as follows: an N-substituted dihydrodesoxynorcodeine compound having attached to the nitrogen atom a terminal carbon atom of a straight aliphatic chain consisting of three carbon atoms (Compound 1) is reacted with a demethylating agent, thereby forming the corresponding N-substituted dihydrodesoxynormorphine compound (Compound 2); the latter compound is reacted with an acid to produce the corresponding salt of said N-substituted dihydrodesoxynormorphine compound (Compound 3); alternatively the N-substituted dihydrodesoxynormorphine compound is reacted with a lower alkanoic anhydride thereby producing the corresponding 3-alkanoyl-N-substituted dihydrodesoxynormorphine compound wherein the N-substituent is an aliphatic radical containing a straight chain consisting of three carbon atoms a terminal carbon of which is attached to the nitrogen atom (Compound 4), which is converted by reaction with an acid to the corresponding acid salt of the 3-alkanoyl-dihydrodesoxynormorphine compound (Compound 5).

The N-substituted dihydrodesoxynorcodeine compounds having attached to the nitrogen atom a terminal carbon of a straight aliphatic chain consisting of three carbon atoms, which are used as starting materials in my novel process, are new compounds which can be prepared by reacting the available desoxycodeine with cyanogen bromide in chloroform solution to form N-cyanodesoxynorcodeine; heating said N-cyanodesoxynorcodeine with aqueous hydrochloric acid thereby hydrolyzing the nitrile substituent and decarboxylating the resulting N-carboxydesoxynorcodeine to produce desoxynorcodeine; reacting the desoxynorcodeine in aqueous acetic acid with hydrogen at a pressure of about fifty pounds per square inch at room temperature in the presence of palladium catalyst to produce dihydrodesoxynorcodeine; and reacting the latter compound in chloroform solution with an aliphatic halide in contact with sodium carbonate thereby forming the corresponding N-substituted dihydrodesoxynorcodeine compound. The aliphatic halides which I use in the aforementioned reaction with dihydrodesoxynorcodeine contain a straight aliphatic chain consisting of three carbon atoms the terminal carbon of which is attached to the halogen atom; in one preferred embodiment of my invention, a methyl grouping is connected to the middle carbon atom of this straight aliphatic chain. I prefer to employ as the aliphatic halide an n-propyl halide such as n-propyl chloride, n-propylbromide, n-propyl iodide, an isobutyl halide such as isobutyl chloride, isobutyl bromide, isobutyl iodide, an allyl halide such as allyl chloride, allyl bromide, allyl iodide, a methallyl halide such as methallyl chloride, methallyl bromide, methallyl iodide, and the like. The reaction between the aliphatic halide and dihydrodesoxynorcodeine is ordinarily conducted by heating the reactants together in contact with an acid-binding agent in a liquid medium which is substantially inert under the reaction conditions and which is a solvent for the reactants. I prefer to utilize, as the liquid medium, a lower aliphatic alcohol such as methanol, ethanol, propanol, and the like. The liquid medium employed should be substantially free of water. As the acid-binding agent I ordinarily utilize an alkali metal carbonate, such as sodium carbonate, potassium carbonate, an alkali metal bicarbonate such as sodium bicarbonate, potassium bicarbonate, an alkaline earth metal carbonate, such as calcium carbonate, barium carbonate, and the like. I prefer to conduct the reaction by bringing together, in an organic solvent, approximately equimolar quantities of dihydrodesoxynorcodeine and the aliphatic halide, and heating the mixture under reflux in contact with an excess of the acid-binding agent for an extended period of time. I have found that, under these reaction conditions, a heating period of about eight hours or more is ordinarily required to complete the reaction between the dihydrodesoxynorcodeine and the aliphatic halide.

In accordance with the foregoing procedure, there is obtained the corresponding N-substituted dihydrodesoxynorcodeine compound having attached to the nitrogen atom a terminal carbon of a straight aliphatic chain consisting of three carbon atoms which may have a methyl grouping attached to the middle carbon atom of said chain, as, for example, N-n-propyldihydrodesoxynorcodeine, N - isobutyldihydrodesoxynorcodeine, N - allyldihydrodesoxynorcodeine, and N - methallyldihydrodesoxynorcodeine. The N - substituted dihydrodesoxynorcodeine compound is conveniently recovered by evaporating the organic solvent from the reaction mixture, preferably under reduced pressure, and extracting the residual material with a hot chlorinated solvent such as chloroform. The chlorinated solvent extract is filtered and the filtered solution is evaporated to dryness to give the N-substituted dihydrodesoxynorcodeine compound in crude form; this crude material can be rendered crystalline by trituration with ether or petroleum ether and the resulting material purified by recrystallization from a lower aliphatic alcohol such as methanol or ethanol.

In accordance with the present invention the N-substituted dihydrodesoxynorcodeine compound having attached to the nitrogen atom a terminal carbon of a straight aliphatic chain consisting of three carbon atoms is reacted with a demethylating agent whereby the 3-methyl ether substituent of the N-substituted dihydrodesoxynorcodeine compound is converted to a phenolic hydroxyl grouping without substantially affecting other substituents in the molecule thereby forming the corresponding N-substituted dihydrodesoxynorcodeine compound. I ordinarily employ, as the demethylating agent the salt of a tertiary amine with a strong acid, as, for example, the hydrohalide of a tertiary heterocyclic amine such as pyridine hydrochloride, pyridine hydrobromide, picoline hydrochloride, picoline hydrobromide, quinoline hydrochloride, quinoline hydrobromide, an alkali metal alkoxide such as sodium ethoxide, sodium methoxide, a hydrohalic acid, such as hydrobromic acid, hydroiodic acid, and the like. The demethylation reaction is ordinarily conducted when using a tertiary amine salt by heating the N-substituted dihydrodesoxynorcodeine compound with the demethylating agent, at an elevated temperature above about 200° C. I prefer to employ pyridine hydrochloride as the demethylating agent and to carry out the reaction by heating the reactants together at a temperature within the range of about 210–225° C.; under these reaction conditions the demethylation is usually substantially complete after a heating period of approximately ten to fifteen minutes. The reaction mixture is then cooled, made slightly basic with a mildly alkaline aqueous solution such as aqueous ammonium hydroxide and the resulting aqueous mixture extracted with a water immiscible organic solvent such as ether. Upon evaporation of the organic solvent extract there is obtained the N-substituted dihydrodesoxynormorphine compound. The N-substituted dihydrodesoxynormorphine compound contains a phenolic hydroxyl grouping and forms a sodium salt which is soluble in water; the N-substituted dihydrodesoxynormorphine compound is thus readily separated from unchanged N-substituted dihydrodesoxynorcodeine which may be present since the latter compound is insoluble in aqueous alkaline solutions. In accordance with this demethylation procedure there are obtained N-substituted dihydrodesoxynormorphine compounds having attached to the nitrogen atom a terminal carbon of a straight aliphatic chain consisting of three carbon atoms which may have a methyl group attached to the middle carbon atom of said chain as for example, N - n - propyldihydrodesoxynormorphine, N - isobutyldihydrodesoxynormorphine, N - allyldihydrodesoxynormorphine, and N-methallyldihydrodesoxynormorphine.

Alternatively, the N-substituted dihydrodesoxynormorphine compounds having attached to the nitrogen atom a terminal carbon of a straight aliphatic chain consisting of three carbon atoms may be prepared by hydrogenation of the corresponding N-substituted desoxynormorphine compounds. This procedure is ordinarily used, however, only for the preparation of N-alkyldihydrodesoxynormorphine compounds such as N-n-propyldihydrodesoxynormorphine and N-isobutyldihydrodesoxynormorphine since hydrogenation of N-alkenyldesoxynormorphine compounds, such as N-allyldesoxynormorphine or N-methallyldesoxynormorphine, results in the formation of the corresponding N-alkyldihydrodesoxynormorphine compound.

The N-substituted desoxynormorphine compounds utilized as starting materials in this alternate procedure, namely the N-alkyldesoxynormorphine compounds, and the N-alkenyldesoxynormorphine compounds can be prepared by reacting the available normorphine with the appropriate aliphatic halide in the presence of an acid-binding agent utilizing substantially the same procedure as that described hereinabove in connection with the reaction between dihydrodesoxynorcodeine and aliphatic halides, thereby forming the corresponding N-substituted normorphine compound having attached to the nitrogen atom a terminal carbon of a straight aliphatic chain consisting of three carbon atoms, such as N-n-propylnormorphine, N-isobutylnormorphine, N-allylnormorphine, N-methallylnormorphine, and the like; this N-substituted normorphine compound is reacted in ethanol, with phenyltrimethyl-ammonium hydroxide to form the corresponding N-substituted norcodeine compound which is reacted in pyridine with p-toluene sulfonyl chloride to produce the 6-(p-toluene sulfonate) of said N-substituted norcodeine compound; the latter compound is then reacted in tetrahydrofuran with lithium aluminum hydride thereby forming the corresponding N-substituted desoxynorcodeine compound which is heated with pyridine hydrochloride at a temperature of about 215° C. to form the corresponding N-substituted desoxynormorphine compound having attached to the nitrogen atom a terminal carbon of a straight aliphatic chain consisting of three carbon atoms such as N-n-propyldesoxynormorphine, N-isobutyldesoxynormorphine, N-allyldesoxynormorphine, N-methallyldesoxynormorphine, and the like used as starting material in my hydrogenation procedure.

The reaction between the N-substituted desoxynormorphine compound and hydrogen is carried out by dissolving the N-substituted desoxynormorphine compound in a lower aliphatic alcohol such as methanol or in a lower alkanoic acid such as acetic acid, or aqueous solutions thereof, and bringing the resulting solution into intimate contact with hydrogen in the presence of a hydrogenation catalyst such as platinum, palladium, or halides thereof. In a preferred embodiment of my procedure, the N-substituted desoxynormorphine compound is dissolved in an aqueous solution of acetic acid and the resulting solution is intimately contacted with hydrogen at a pressure somewhat below 100 pounds per square inch, preferably about 40 pounds per square inch, at a temperature of about 30° C., and in the presence of a palladium catalyst. The N-alkyldihydrodesoxynormorphine compound thus produced can be recovered by filtering the hydrogenation mixture, making the filtered solution alkaline with ammonium hydroxide, whereby the N-alkyldihydrodesoxynormorphine crystallizes therefrom and can be recovered by filtration.

The N-substituted dihydrodesoxynormorphine compound having attached to the nitrogen atom a terminal carbon of a straight aliphatic chain consisting of three carbon atoms is then reacted with a lower alkanoic anhydride such as acetic anhydride, propionic anhydride, and the like, thereby esterifying the hydroxyl radical in the 3-position of the molecule to form the corresponding 3-alkanoyl N-substituted dihydrodesoxynormorphine compound having attached to the nitrogen atom the terminal carbon of a straight aliphatic chain consisting of three carbon atoms which may have a methyl grouping attached to the middle carbon atom of said chain as, for example 3-acetyl-N-(n-propyl)-dihydrodesoxynormorphine, 3-propionyl-N-(n-propyl)-dihydrodesoxynormorphine, 3-butyryl-N-(n-propyl)-dihydrodesoxynormorphine, 3-acetyl-N-isobutyldihydrodesoxynormorphine, 3-propionyl-N-isobutyldihydrodesoxynormorphine, 3-butyryl-N-isobutyldihydrodesoxynormorphine, 3-acetyl - N - allyldihydrodesoxynormorphine, 3 - propionyl-N-allyldihydrodesoxynormorphine; 3-butyryl-N-allyldihydrodesoxynormorphine, 3- acetyl-N-methallyldihydrodesoxynormorphine, 3-propionyl-N-methallyldihydrodesoxynormorphine, 3 - butyryl - N-methallyldihydrodesoxynormorphine, and the like.

The reaction between the alkanoic acid anhydride and the N-substituted dihydrodesoxynormorphine compound is ordinarily conducted by heating a mixture of the reactants to a temperature of about 100° C. for a period of about two to three hours. The reaction mixture is then evaporated under reduced pressure, and the residual material is purified by recrystallization from a lower alkanol such as ethanol to give the 3-alkanoyl-N-substituted dihydrodesoxynormorphine compound in substantially pure form.

The conversion of the N-substituted dihydrodesoxynormorphine compounds, or their lower alkanoyl esters, the 3-alkanoyl-N-substituted dihydrodesoxynormorphine compounds, to the corresponding acid salts is ordinarily conducted by reacting the N-substituted dihydrodesoxynormorphine compound or the 3-alkanoyl-N-substituted dihydrodesoxynormorphine compound, under substantially anhydrous conditions, with an acid, as for example, hydrogen chloride, hydrogen bromide, sulfuric acid, acetic acid, tartaric acid, citric acid, and the like. This salt-forming reaction is conveniently carried out by dissolving the N-substituted dihydrodesoxynormorphine compound, or the 3-alkanoyl-N-substituted dihydrodesoxynormorphine compound, in a hot lower alkanol, such as ethanol, methanol, propanol, and the like, and adding to the solution a slight excess of an alcoholic solution of the appropriate acid. Upon diluting the resulting alcoholic medium with an alcohol miscible non-solvent for the product, such as diethyl ether, there crystallizes from the mixture (depending on whether the N-substituted dihydrodesoxynormorphine, or its ester, is used as starting material) the acid salt of the N-substituted dihydrodesoxynormorphine compound, or the acid salt of the 3-alkanoyl-N-substituted dihydrodesoxynormorphine compound, such as N-n-propyldihydrodesoxynormorphine hydrochloride, N - n - propyldihydrodesoxynormorphine hydrobromide, N-n-propyldihydrodesoxynormorphine sulfate, N-n-propyldihydrodesoxynormorphine acetate, N-n-propyldihydrodesoxynormorphine tartrate, N-isobutyldihydrodesoxynormorphine hydrochloride, N-isobutyldihydrodesoxynormorphine hydrobromide, N-isobutyldihydrodesoxynormorphine sulfate, N-isobutyldihydrodesoxynormorphine acetate, N-isobutyldihydrodesoxynormorphine tartrate, N-allyldihydrodesoxynormorphine hydrochloride, N-allyldihydrodesoxynormorphine hydrobromide, N-allyldihydrodesoxynormorphine sulfate, N-allyldihydrodesoxynormorphine tartrate, N-allyldihydrodesoxynormorphine acetate, N-methallyldihydrodesoxynormorphine hydrochloride, N-methallyldihydrodesoxynormorphine hydrobromide, N-methallyldihydrodesoxynormorphine sulfate, N-methallyldihydrodesoxynormorphine tartrate, N-methallyldihydrodesoxynormorphine acetate, 3-acetyl-N-(n-propyl)-dihydrodesoxynormorphine hydrochloride, 3-acetyl-N-(n-propyl) - dihydrodesoxynormorphine hydrobromide, 3 - acetyl-N-(n-propyl)-dihydrodesoxynormorphine sulfate, 3 - acetyl-N-(n-propyl)-dihydrodesoxynormorphine acetate, 3-acetyl-N-(n-propyl)-dihydrodesoxynormorphine tartrate, 3 - propionyl - N - (n - propyl) - dihydrodesoxynormorphine hydrochloride, 3-propionyl-N-(n-propyl)-dihydrodesoxynormorphine hydrobromide, 3-propionyl-N-(n-propyl)-dihydrodesoxynormorphine sulfate, 3 - propionyl - N -(n-propyl)- dihydrodesoxynormorphine acetate, 3-butyryl-N-(n-propyl)-dihydrodesoxynormorphine hydrochloride, 3-butyryl-N-(n-propyl)-dihydrodesoxynormorphine hydrobromide, 3-butyryl-N-(n-propyl)-dihydrodesoxynormorphine sulfate, 3-butyryl-N-(n-propyl)-dihydrodesoxynormorphine tartrate, 3-acetyl-N-isobutyldihydrodesoxynormorphine hydrochloride, 3-acetyl - N - isobutyldihydrodesoxynormorphine hydrobromide, 3-acetyl-N-isobutyldihydrodesoxynormorphine sulfate, 3-acetyl-N-isobutyldihydrodesoxynormorphine acetate, 3-acetyl-N-isobutyldihydrodesoxynormorphine tartrate, 3 - propionyl-N-isobutyldihydrodesoxynormorphine hydrochloride, 3-propionyl-N-isobutyldihydrodesoxynormorphine hydrobromide, 3-propionyl - N - isobutyldihydrodesoxynormorphine sulfate, 3-propionyl-N-isobutyldihydrodesoxynormorphine acetate, 3-butyryl-N-isobutyldihydrodesoxynormorphine hydrochloride, 3-butyryl-N-isobutyldihydrodesoxynormorphine hydrobromide, 3-butyryl-N-isobutyldihydrodesoxynormorphine sulfate, 3-butyryl-N-isobutyldihydrodesoxynormorphine tartrate, 3-acetyl-N-allyldihydrodesoxynormorphine hydrochloride, 3-acetyl-N-allyldihydrodesoxynormorphine hydrobromide, 3-acetyl-N-allyldihydrodesoxynormorphine sulfate, 3-acetyl-N-allyldihydrodesoxynormorphine acetate, 3-acetyl-N-allyldihydrodesoxynormorphine tartrate, 3-propionyl-N-allyldihydrodesoxynormorphine hydrochloride, 3-propionyl-N-allyldihydrodesoxynormorphine hydrobromide, 3-propionyl-N-allyldihydrodesoxynormorphine sulfate, 3-propionyl-N-allyldihydrodesoxynormorphine tartrate, 3-butyryl-N-allyldihydrodesoxynormorphine hydrochloride, 3-butyryl - N - allyldihydrodesoxynormorphine hydrobromide, 3-butyryl-N-allyldihydrodesoxynormorphine sulfate, 3-butyryl-N-allyldihydrodesoxynormorphine acetate, 3-acetyl-N-methallyldihydrodesoxynormorphine hydrochloride, 3-acetyl-N-methallyldihydrodesoxynormorphine hydrobromide, 3-acetyl-N-methallyldihydrodesoxynormorphine sulfate, 3-acetyl-N-methallyldihydrodesoxynormorphine tartrate, 3-acetyl-N-methallyldihydrodesoxynormorphine acetate, 3-propionyl-N-methallyldihydrodesoxynormorphine hydrochloride, 3-propionyl-N-methallyldihydrodesoxynormorphine hydrobromide, 3 - propionyl-N-methallyldihydrodesoxynormorphine sulfate, 3-propionyl-N-methallyldihydrodesoxynormorphine acetate, 3-butyryl-N-methallyldihydrodesoxynormorphine hydrochloride, 3-butyryl-N-methallyldihydrodesoxynormorphine hydrobromide, 3 - butyryl-N-methallyldihydrodesoxynormorphine sulfate, 3-butyryl-N-methallyldihydrodesoxynormorphine tartrate, and the like. The salt thus formed is recovered from the alcoholic slurry by filtration or centrifugation.

The following examples illustrate methods of carrying out the present invention, but it is to be understood that these examples are given for purposes of illustration and not of limitation.

Example 1

A solution of 444 mg. of N-allyldesoxynormorphine in 20 ml. a 50% aqueous acetic acid solution was reacted with hydrogen at a pressure of about 40 pounds per square inch and at a temperature of about 25 to 30° C. in the presence of 0.1 g. of palladium chloride catalyst. The reaction mixture was filtered thereby removing the catalyst. The filtered solution was cooled and the cooled solution was rendered slightly basic by the addition thereto of an aqueous solution of ammonium hydroxide, whereupon an amorphous solid material precipitated. The resulting mixture was extracted with ether and the ethereal solution was washed, dried and the ether evaporated therefrom. The residual material was crystallized from 4 ml. of ethyl acetate to give N-propyldihydrodesoxynormorphine; M. P. 141–144° C.; $[\alpha]_D^{25} = -91.5°$ (C, 0.75 in absolute ethanol). Analysis.—Calc'd for $C_{19}H_{25}NO_2$: C, 76.20; H, 8.42. Found: C, 76.20; H, 8.39.

The N-allyldesoxynormorphine utilized as starting material in the foregoing process is a new compound which can be prepared in accordance with the following five-step procedure: (1) Thirty-five grams of normorphine and 7.95 g. of allyl bromide is dissolved in 350 cc. of chloroform and the solution is heated in a sealed tube at a temperature of 110° C. for a period of three and one-half hours. The reaction mixture is filtered, and the residual solid material extracted with chloroform. The chloroform extract is evaporated to dryness in vacuo, and the residual material is triturated with 75 cc. of ether. The resulting mixture is cooled to approximately 0° C. and maintained at that temperature for a period of about two hours. The precipitated material is recovered from the resulting slurry by filtration, and is extracted for fifteen hours with anhydrous ether utilizing a Soxhlet extractor. The ether extract is evaporated in the absence of air to incipient crystallization, cooled to 0° C. and maintained at that temperature for a period of about fifteen hours. The crystalline material which separates is recovered by filtration, washed with ether and dried in vacuo to give substantially pure N-allylnormorphine; M. P. 208–209° C.

(2) One equivalent weight of phenyltrimethyl-ammonium chloride is added to an ethanol solution containing approximately one equivalent weight of sodium ethoxide. The resulting mixture is filtered thereby removing the precipitated sodium chloride, and to the filtered ethanolic solution containing approximately one equivalent of phenyltrimethyl-ammonium hydroxide is added one equivalent weight of N-allylnormorphine. The resulting mixture is heated and the ethanol distilled therefrom until the temperature of the distilland is approximately 120° C. The reaction mixture is then cooled and an excess of acetic acid (approximately 1.2 equivalents) is added to the cooled mixture. The resulting mixture is subjected to steam distillation thereby steam distilling the by-product dimethyl aniline. To the aqueous distilland is added sufficient aqueous sodium hydroxide solution to render the mixture slightly alkaline, and this aqueous alkaline mixture is extracted with chloroform. The chloroform is evaporated from the resulting chloroform extract, and the residual crystalline material is washed with ether and dried to give N-allylnorcodeine.

(3) A solution of 3.25 g. of N-allylnorcodeine in 3.2 ml. of dry pyridine is cooled to a temperature of about —10° C. and to the cold solution is added a solution of 2.2 g. of p-toluene sulfonyl chloride in 2.2 ml. of dry pyridine. The resulting mixture is allowed to stand at a temperature of 0° C. for a period of four hours and the reaction mixture is then poured into 110 ml. of cold water containing 1.5 g. of sodium bicarbonate. The gummy material which precipitates is recovered by decantation, washed with cold water and extracted with chloroform. The chloroform extract is washed with water, then with an aqueous solution of sodium bicarbonate, and again with water. The chloroform is evaporated under reduced pressure from the washed chloroform extract, and the residual gummy material is dissolved in ether. To this ether solution is added an excess of ethanolic hydrogen bromide, and the crystalline material which precipitates is recovered by filtration and recrystallized from methanol to give substantially pure 6-(p-toluenesulfonyl) - N - allylnorcodeine hydrobromide; M. P. 145–146° C. This material is dissolved in water, dilute aqueous sodium hydroxide is added to the solution, and the resulting aqueous alkaline mixture is extracted with ether. The ethereal extract is washed with water, dried and the ether evaporated to give crystalline 6-(p-toluenesulfonyl)-N-allyl norcodiene; M. P. 110–111° C.

(4) A solution of 2 g. of 6-(p-toluenesulfonyl)-N-allylnorcodeine in 20 ml. of purified tetrahydrofuran is slowly added to a solution of 0.6 g. of lithium aluminum hydride in 30 ml. of purified tetrahydrofuran. After the initial mildly exothermic reaction has subsided, the mixture is heated under reflux for a period of four hours. Fifty milliliters of ether is added to the reaction mixture followed by the dropwise addition of water to decompose unreacted lithium aluminum hydride. The crystalline material which precipitates is recovered by filtration and dissolved in hot ether. The ethereal solution is washed with water, dried over anhydrous magnesium sulfate, and the dry ethereal solution is evaporated to dryness. The residual material is recrystallized from ether to give substantially pure N-allyldesoxynorcodeine; M. P. 75–77° C.

(5) A mixture of 2 g. of N-allyldesoxynorcodeine and 6 g. of pyridine hydrochloride is heated at a temperature of 210–225° C. for a period of ten minutes. The reaction mixture is cooled and diluted with 20 ml. of water. To this aqueous mixture is added 20 ml. of ether, and the resulting mixture is rendered slightly basic by the addition thereto of an aqueous solution of ammonium hydroxide. The ethereal layer is separated and the aqueous phase is extracted with five portions of ether. The original ether layer and ethereal extracts are combined, and the resulting ethereal solution is washed with water, dried and the ether evaporated therefrom. The residual oil is redissolved in ether and the ethereal solution extracted with 0.5 N aqueous sodium hydroxide solution. The aqueous alkaline extract is made acid by the addition of aqueous hydrochloric acid solution and the pH of the resulting solution is then adjusted to about 8 by the addition of aqueous ammonium hydroxide solution. The mildly alkaline aqueous solution is extracted with four portions of ether, the ether extracts are combined, and the ethereal solution is evaporated to dryness. The residual light-tan crystalline solid is recrystallized from ethyl acetate to give substantially pure N-allyldesoxynormorphine; M. P. 174–175° C.

*Example 2*

A mixture of one gram of N-allyldihydrodesoxynorcodeine hydrobromide and 3 g. of dry pyridine hydrochloride was heated at a temperature of about 215–255° C. for a period of approximately twenty minutes. The reaction mixture was cooled and to the cooled reaction mixture was added about 10 ml. of water; about 25 mg. of sodium hydrosulfite was added to the resulting solution to inhibit any possible oxidation of the "phenol." The pH of the solution was then adjusted to about 8 by the addition of ammonium hydroxide solution. The slightly basic solution was extracted with four portions of diethyl ether, and the ethereal extracts were combined. The resulting ethereal solution was washed with water, dried over magnesium sulfate and evaporated to dryness under reduced pressure. The residual oily material was redissolved in ether and the ethereal solution was extracted with a dilute aqueous solution of sodium hydroxide having a normality of approximately 1.0. The aqueous alkaline extract was neutralized with hydrochloric acid, and the neutralized solution was extracted with ether. The ether was evaporated from the ethereal extract under reduced pressure to give a residual pink, amorphous material which crystallized upon trituration with ether. This crystalline material was recrystallized from ethyl acetate to give substantially pure N-allyldihydrodesoxynormorphine; M. P. 141–142° C.

The N-allyldihydrodesoxynorcodeine hydrobromide utilized as starting material in the foregoing process is a new compound which was prepared in accordance with the following four-step procedure: (1) A solution of 7.8 g. of cyanogen bromide in 25 ml. of dry chloroform was stirred and heated under reflux while adding thereto, dropwise over a period of one hour, a solution of 19.0 g. of desoxycodeine in 45 ml. of dry chloroform. The resulting solution was heated under reflux for an additional period of five hours. The reaction mixture was cooled and diluted with 400 ml. of ether. The ethereal solution was separated from the gummy material which precipitated by filtration and the filtered ethereal solution was evaporated to small volume under reduced pressure. The concentrated solution was cooled and the crystalline material which separated was recrystallized from ethyl acetate to give substantially pure N-cyanodesoxynorcodeine; M. P. 149–150° C.; $[\alpha]_D^{25} = -130°$ (C, 0.75 in absolute ethanol). *Analysis.*—Calc'd for $C_{18}H_{18}N_2O_2$: C, 73.45; H, 6.16. Found: C, 73.60; H, 6.20.

(2) A mixture of 33 g. of N-cyanodesoxynorcodeine, 128 ml. of glacial acetic acid, 45 ml. of concentrated aqueous hydrochloric acid and 900 ml. of distilled water was heated at a temperature of about 90° C. for a period of about ninety hours. The resulting reaction mixture was filtered through a mat of activated charcoal. The substantially decolorized, light-yellow filtrate was cooled to about room temperature and an aqueous solution of ammonium hydroxide was added thereto portionwise, whereupon an oil separated. The portionwise addition of the aqueous ammonium hydroxide was continued until no further oil separated. The resulting mixture was then extracted with three portions of ether, the combined ethereal extracts were dried over magnesium sulfate and the ether was evaporated from the dried ethereal solution under reduced pressure. The residual crystalline material was recrystallized from ether to give substantially pure desoxynorcodeine; M. P. 85–86° C.

(3) A solution of 4 g. of desoxynorcodeine in 25 ml. of 50% aqueous acetic acid was reacted with hydrogen at a pressure of about 40 pounds per square inch and at a temperature of about 25–30° C. in the presence of 0.1 g. of palladium chloride catalyst. The reaction mixture was filtered thereby removing the catalyst and the filtered solution was made slightly alkaline with aqueous sodium hydroxide solution. The amorphous gummy material which precipitated was extracted into chloroform; the chloroform extracts were dried over magnesium sulfate and evaporated to dryness under reduced pressure to give dihydrodesoxynorcodeine which was obtained in the form of a residual oil. The dihydrodesoxynorcodeine was dissolved in ethanol and the solution was added to an ethanolic solution of hydrogen bromide. The reaction solution was cooled to about 0° C. and the crystalline material which precipitated was recovered and recrystallized from ethanol-ether to give substantially pure dihydrodesoxynorcodeine hydrobromide; M. P. 305–308° C.

(4) A mixture of 3 g. of dihydrodesoxynorcodeine hydrobromide, 1.75 g. of sodium bicarbonate, 1.03 g. of allyl bromide and 25 ml. of absolute ethanol was heated under reflux with stirring for a period of about five hours. At the end of this period some insoluble material was present and was removed by filtration. The filtered solution was evaporated to dryness in vacuo; the residual material was slurried with several portions of diethyl ether, and the ethereal extract was filtered. The filtered ethereal solution was evaporated to dryness in vacuo to give N-allyldihydrodesoxynorcodeine which was obtained in the form of an oil which crystallized upon cooling. The N-allyldihydrodesoxynorcodeine was reacted with ethanolic hydrogen bromide, the alcoholic reaction solution was cooled, and the crystalline product which separated was recovered by filtration and purified by recrystallization from ethanol-diethyl ether to give substantially pure N-allyldihydrodesoxynorcodeine hydrobromide; M. P. 214–215° C.

Various changes and modifications may be made in carrying out the present invention without departing from the spirit and scope thereof. Insofar as these changes and modifications are within the purview of the annexed claims, they are to be considered as part of my invention.

I claim:

1. A compound selected from the group which consists of N-substituted dihydrodesoxynormorphine compounds having attached to the nitrogen atom a radical selected from the group consisting of N-n-propyl, N-isobutyl, N-allyl and N-methallyl radicals, lower alkanoyl esters of said N-substituted dihydrodesoxynormorphine compounds, and acid addition salts thereof.

2. N-n-propyldihydrodesoxynormorphine.

3. N - n - propyldihydrodesoxynormorphine hydrochloride.

4. 3 - acetyl - N - (n-propyl) - dihydrodesoxynormorphine acetate.

5. N-allyldihydrodesoxynormorphine.

6. N-allyldihydrodesoxynormorphine sulfate.

7. The process which comprises reacting a demethylating agent with an N-substituted dihydrodesoxynorcodeine compound having attached to the nitrogen atom a radical selected from the group consisting of N-n-propyl, N-isobutyl, N-allyl and N-methallyl radicals, thereby forming the corresponding N-substituted dihydrodesoxynormorphine compound.

8. The process which comprises reacting pyridine hydrochloride with N-n-propyldihydrodesoxynorcodeine to produce N-n-propyldihydrodesoxynormorphine.

9. The process which comprises reacting pyridine hydrochloride with N-allyldihydrodesoxynorcodeine to produce N-allyldihydrodesoxynormorphine.

10. The process which comprises heating a fused melt comprising pyridine hydrochloride and N-allyldihydrodesoxynorcodeine at a temperature of about 210–225° C. thereby forming N-allyldihydrodesoxynormorphine.

11. The process which comprises reacting an N-substituted desoxynormorphine compound, having attached to the nitrogen atom a radical selected from the group consisting of N-n-propyl, N-isobutyl, N-allyl and N-methallyl radicals, with hydrogen under pressure in the presence of a noble metal hydrogenation catalyst thereby forming the corresponding N-substituted dihydrodesoxynormorphine compound.

12. The process which comprises reacting, together, in a medium comprising aqueous acetic acid and in the presence of palladium chloride catalyst, N-allyldesoxynormorphine and hydrogen thereby forming N-n-propyldihydrodesoxynormorphine.

References Cited in the file of this patent

Pohl: Chem. Zent. 1916, I, 1169.
Braun: Ber. 49, 977–89 (1916).
Henry: Plant Alkaloids, 4th ed. (Blakiston), page 254.